(No Model.) 2 Sheets—Sheet 1.

J. P. WENSING.
HOT WATER HEATER.

No. 574,593. Patented Jan. 5, 1897.

Witnesses.
C. H. Kuney
Anna V. Faust

Inventor.
John P. Wensing.
By Benedict & Morsell
Attorneys.

THE NORRIS PETERS CO., PHOTO-LITHO., WASHINGTON, D. C.

(No Model.) 2 Sheets—Sheet 2.
J. P. WENSING.
HOT WATER HEATER.
No. 574,593. Patented Jan. 5, 1897.
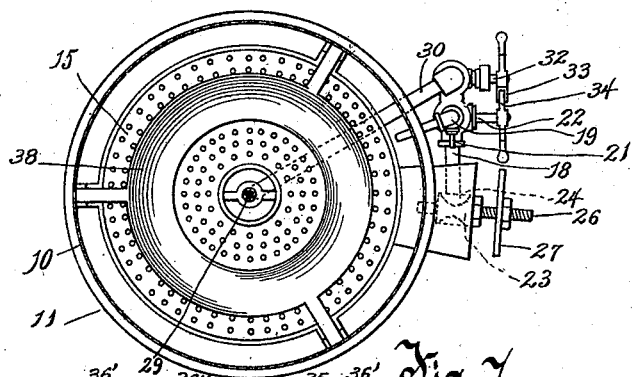
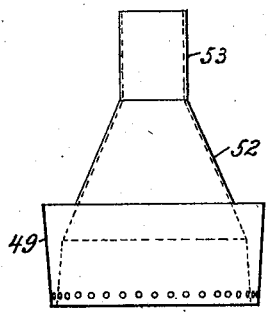
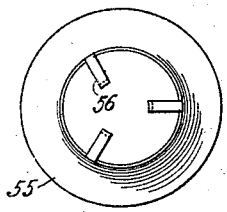
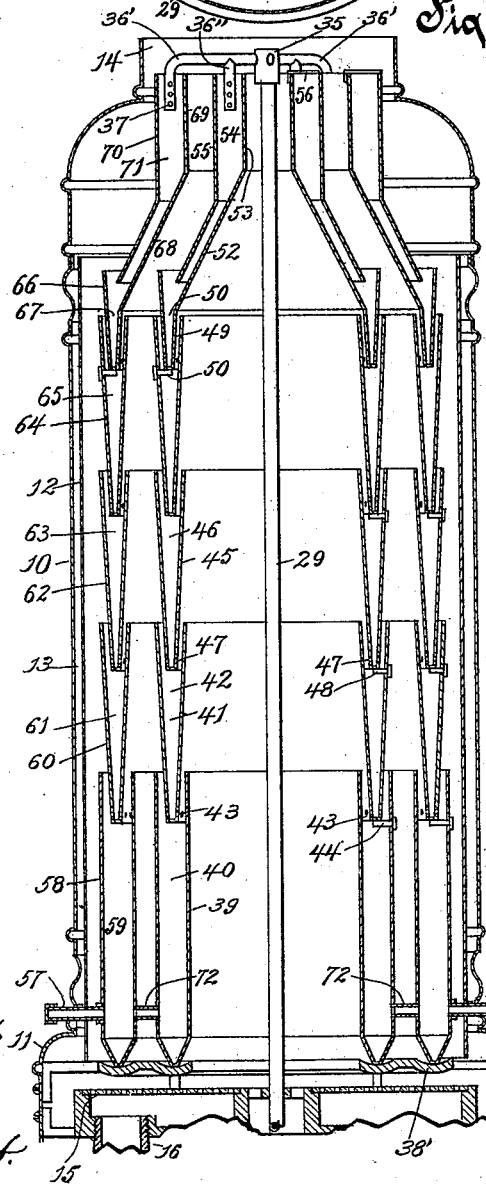
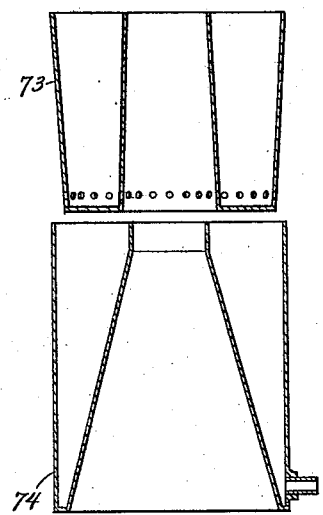
Witnesses. Inventor.
John P. Wensing,
By Benedict & Morsell
Attorneys.

UNITED STATES PATENT OFFICE.

JOHN P. WENSING, OF MILWAUKEE, WISCONSIN, ASSIGNOR OF TWO-THIRDS TO FREDERICK DAASE AND ARTHUR J. MAAG, OF SAME PLACE.

HOT-WATER HEATER.

SPECIFICATION forming part of Letters Patent No. 574,593, dated January 5, 1897.

Application filed March 30, 1896. Serial No. 585,392. (No model.)

*To all whom it may concern:*

Be it known that I, JOHN P. WENSING, of Milwaukee, in the county of Milwaukee and State of Wisconsin, have invented a new and useful Improvement in Hot-Water Heaters, of which the following is a description, reference being had to the accompanying drawings, which are a part of this specification.

My invention has relation to improvements in hot-water heaters.

The object of the invention is to provide a simple and improved device for heating water which can be used to great advantage, particularly in houses not supplied with modern appliances for the heating of water.

The invention is so constructed as to be readily arranged to supply hot water to a bath-tub, stationary washbasin, and the like.

With the above object in view the invention consists of the devices and parts, or their equivalents, as hereinafter more fully set forth.

Figure 1:
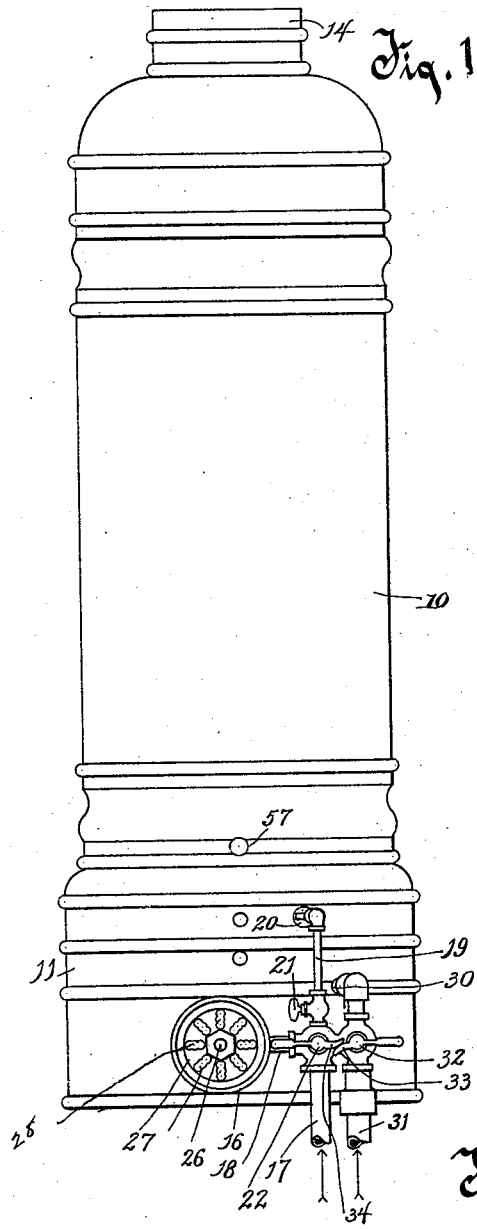
Figure 2:
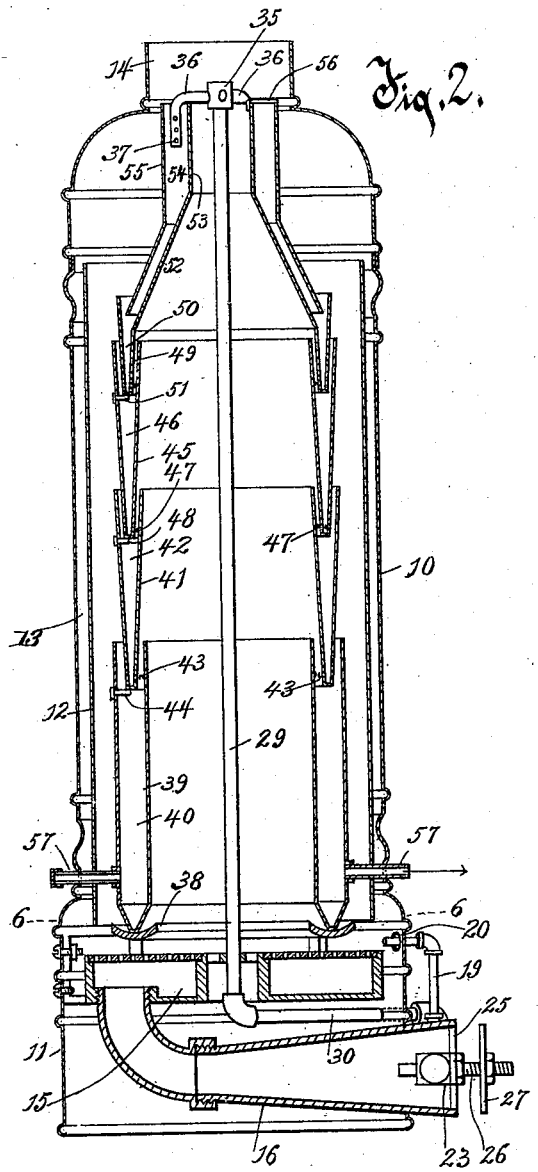
Figure 3:
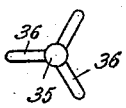

In the accompanying drawings, Figure 1 is an elevation of the simplest form of my device. Fig. 2 is a vertical sectional view of Fig. 1. Fig. 3 is a plan view of the water-distributing device. Fig. 4 is an elevation of the inner portion of the upper water-jacket. Fig. 5 is a plan view of the hood for this jacket. Fig. 6 is a horizontal section on the line 6 6 of Fig. 2. Fig. 7 is a vertical sectional view of a double form of the heater. Fig. 8 is a sectional view of a modified form of water-jacket; and Fig. 9 is a sectional view of the lowermost jacket of the series, in which the modified form Fig. 8 would fit.

Referring to the drawings, the numeral 10 indicates the outer casing of the heater, preferably of cylindrical form, and provided with a base portion 11, forming a continuation thereof. Within the outer casing, at a slight distance therefrom, is an inner wall 12, the space between said wall and the outer casing forming an air-chamber 13. This inner wall and the air-chamber serve to retard the radiation of the heat. The top of the casing is provided with a flue or chimney 14 for carrying off the heated air. Within the base 11 of the casing is suitably supported a burner 15, preferably an annular chamber provided with the usual perforated top plate. Leading from the exterior to this burner is an air-pipe 16.

The numeral 17 indicates the main fuel-supply pipe, having one branch, 18, leading to the air-pipe and another branch, 19, leading upwardly and extending inwardly into the casing above the burner, forming a gas lead or igniter. This branch pipe extends through an opening 20 in the casing. This opening is sufficiently larger than the diameter of the pipe to permit a taper or match to be inserted therein for the purpose of igniting the gas escaping from the lead-pipe when the valve 21 of said pipe is opened up. The main pipe 17 is also provided with a valve 22 for regulating the flow of gas to the branch pipe 18. The end of the branch pipe 18 which extends into the air-pipe fits into a tubular support 23. This support is provided upon opposite sides with openings 24 24, so that the connection can be made through either side of the air-pipe. The support is held in place by a vertical arm 25, intersecting the outer end of the air-pipe. Extending outwardly from the arm 25 is a screw-bolt 26, upon which turns a gate 27, said gate adapted to be adjusted closer to or farther away from the mouth of the air-pipe, in order to regulate the quantity of air admitted. The gate is also provided with a series of air-openings 28.

Extending centrally through the heater is a vertical water-pipe 29. This pipe extends to the exterior by a branch pipe 30, which branch pipe at its outer end connects with the main water-supply pipe 31. This water-supply pipe is provided with a valve 32, by which the supply of water may be turned on or shut off. It will be noticed that the handle of this valve is provided with a projection 33, which contacts with a corresponding projection 34 from the handle of the valve 22. It will be seen that the projection 34 is arranged above the projection 33, and that the valve 22 is opened to the pipe 18 by pressing upwardly on the end of the handle, and consequently causing a down movement of the projection 34. This projection 34, acting on the projection 33, will necessarily cause the turning of the valve 32. The gas therefore cannot be turned on without simultaneously turning on the water, while, on the other hand, the water can be turned on without affecting, or independent of, the gas.

At the upper end of the vertical water-pipe 29 is a water-distributing device, consisting of a central tubular cap 35, fitting the upper end of the pipe 29, and a series of angular pipes 36, extending therefrom, the depending portions of said pipes being provided with perforations 37.

Within the upper portion of the base of the casing is suitably supported a trough or channel 38, preferably of annular form. This trough or channel serves as a support for the lower end of the lower water-jacket 39. This jacket is advisably of annular form and consists of inner and outer walls forming a chamber or space 40. The lower ends of the two walls converge into approximate V form, the angle or edge thereof resting in the trough or channel 38. The next water-jacket of the series is indicated by the numeral 41, and comprises inner and outer walls gradually converging toward the lower end thereof and forming therebetween a chamber or space 42. The lower ends of the walls are provided with a series of perforations 43. The jacket 41 extends for a short distance into the chamber 40 of the lower water-jacket and is supported by means of a series of pins or lugs 44, extending inwardly from the outer wall of the lower jacket.

The succeeding water-jacket is indicated by the numeral 45, and is identical in construction with the jacket just described. It is provided with a chamber 46 and at its lower end is formed with a series of perforations 47. It is supported within the upper end of the chamber or space 42 by means of inwardly-extending pins or lugs 48.

The top jacket of the series is indicated by the numeral 49, and like the other jackets is provided with a chamber 50, formed between the inner and outer walls, and is supported at its lower end upon inwardly-extending lugs or pins 51. It differs from the preceding jackets of the series, however, with respect to the formation of the inner wall, which branches off to form a conical portion 52, said conical portion terminating in a straight upwardly-extending tube 53, which leads to the chimney 14 of the casing 10. Surrounding the conical portion 52 and the straight upwardly-extending tube 53, with a space 54 intervening, is a hood 55. This hood at its upper end is provided with a series of inwardly-extending arms 56, the inner ends of said arms being bent downwardly and engaging over the upper edge of the straight tube 53. By this means the hood is held in suspended position.

Extending from the lower water-jacket 39 are outlet-pipes 57 57.

In the practical application of my invention the water-supply pipe 31 may be connected up to the source of water-supply, while the fuel-supply pipe 17 may be connected to a gas-pipe or other source of fuel-supply. The casing can be conveniently arranged over a bath-tub, stationary washbasin, or the like in a position to allow one of the outlet-pipes 57 to project over the tub or basin, so as to direct the water therein.

In operation the water can be first turned on or the water and gas turned on simultaneously. The valve 21 is also turned so as to allow the gas to pass up the lead-pipe 19. The gas issuing out of the lead-pipe may be lighted, so as to ignite the gas which passes by way of the pipe 18 to and through the top apertured plate of the burner. As said gas escapes through the apertures of this top plate it is ignited by the flame at the end of the igniter-pipe 19. The heated air arising from the burner circulates freely within the casing 10 and is free to pass up the vertical passage formed by the inner walls of the several water-jackets and also ascend in the space around the outer walls of said jackets. The water passes up the central vertical pipe 29 and issues out of the perforations 37 of the angular pipes 36, and first passes into the space 54 and thence into the chamber 50. As the lower end of this chamber is contracted, the water is spread more or less evenly against the opposite sides of the walls of the chamber, and thereby secures the best effects of the heated air. The water passing through the perforations of this chamber falls into the chamber 46 of the next water-jacket, thence through the perforations 47 thereof into the chamber or space 42 of the water-jacket 41, thence through the perforations 43 into the chamber 40 of the lower water-jacket 39, and finally through the outlet-pipe 57. Any sweat or leakage from this lower water-jacket is caught in the channel or trough 38, and is finally evaporated by the heat of the burner.

It will be seen that owing to the slow progress of the water in its travel from the water-distributing pipes into the upper water-jacket, and thence through the successive jackets following, it is given every opportunity to be thoroughly heated, and as the hot air at the same time circulates around the water on every side the best possible heating effect is secured.

In the double form of heater illustrated in Fig. 7 the same general construction is maintained throughout excepting that the parts are duplicated, that is to say, an outer and separate set of water-jackets is employed surrounding the inner water-jackets, or the jackets corresponding to those illustrated in Fig. 2. The lower water-jacket of this outer series is indicated by the numeral 58, and the chamber thereof by the numeral 59. The next jacket of this series is indicated by the numeral 60, and its chamber by the numeral 61. 62 indicates the succeeding water-jacket, and 63 the chamber thereof; 64, the succeeding jacket, and 65 the chamber thereof, and 66 indicates the top water-jacket of this series, 67 being the chamber of said top jacket.

The conical portion of the inner wall of this top water-jacket 66 is designated by the numeral 68 and the straight upwardly-extending tube by the numeral 69. The hood surrounding said conical portion and upwardly-extending tube is indicated by the numeral 70. The annular trough for supporting the lower ends of the lower water-jackets is somewhat different from that illustrated in Fig. 2 in that it is of double form, that is to say, provided with two channels, each channel supporting the lower end of a lower water-jacket. This double channel or trough is indicated by the numeral 38'. The upper water-distributing device is also modified somewhat to adapt it for supplying both sets of water-jackets. The angular arms extending from the tubular cap 35, and which arms in this form are designated by the numeral 36', extend out to and downwardly into the space 71 formed between the hood 70 and the straight upwardly-extending tube 69. In order to supply water to the space 54, downwardly-extending branch pipes 36'' project from the angular pipes 36'. In order to adapt the water which passes through the series of jackets into the lower water-jackets to pass out of a single discharge, the water-jackets 39 and 58 are connected by the pipes 72. The operation of this form of device is exactly the same as that described in regard to the single heater illustrated in Figs. 1 and 2, excepting that two streams of water pass through separate and distinct sets of jackets. This heater is advisably used where greater heating capacity is required.

In Fig. 8 is illustrated a modified form of water-jacket which may perhaps be used to advantage in places where water is required to be used containing a considerable quantity of sediment, which sediment would be apt to clog up the lower contracted ends of the form of jackets illustrated in the other figures of the drawings, and thus prevent the water from passing through the apertures. This form of jacket illustrated in Fig. 8 is designated by the numeral 73. It is practically the same construction as the other forms, excepting that the lower end of the chamber of the jacket is less contracted.

Fig. 9 indicates the form of lower jacket which is advisably used in connection with a water-jacket similar to 73. This lower jacket, Fig. 9, is designated by the numeral 74.

What I claim as my invention, and desire to secure by Letters Patent, is—

1. In a water-heater, the combination, of a casing, a series of water-jackets in the casing, each jacket consisting of inner and outer annular walls forming a water-chamber therebetween, the lower end of each upper jacket extending to or into the upper end of the next jacket below, and provided with a discharge orifice or orifices, the inner walls of the several jackets thereby forming a continuous upwardly-extending central heating-chamber, a burner in the casing adapted to discharge the products of combustion into the heating-chamber, and a water-pipe extending into the casing and adapted for discharging into the water-chamber of the upper jacket.

2. In a water-heater, the combination, of a casing, a series of water-jackets in the casing, each jacket consisting of inner and outer annular walls forming a water-chamber therebetween, the lower ends of the several jackets being contracted and provided with a discharge orifice or orifices, the contracted ends of the upper jackets of the series extending and adapted to discharge into the upper widened ends of the succeeding jackets, and the inner walls of the several jackets thereby forming a continuous upwardly-extending central heating-chamber, a burner in the casing adapted to discharge the products of combustion into the heating-chamber, and a water-pipe extending into the casing, and adapted for discharging into the water-chamber of the upper jacket.

3. In a water-heater, the combination, of a casing, a series of water-jackets in the casing and arranged at a distance from the wall forming said casing, each jacket consisting of inner and outer annular walls forming a water-chamber therebetween, the lower end of each upper jacket extending to or into the upper end of the next succeeding jacket below, and provided with a discharge orifice or orifices, the inner walls of the several jackets forming a continuous upwardly-extending central heating-chamber, and the space confined between the outer walls of these jackets and the casing forming an outer heating-space, a burner in the casing adapted to discharge the products of combustion into the central upwardly-extending heating-chamber and into the outer heating-space, and a water-pipe extending into the casing and adapted for discharging into the water-chamber of the upper jacket.

4. In a water-heater, the combination, of a casing, a series of water-jackets in the casing and arranged at a distance from the inner side of the wall forming the casing, each jacket consisting of inner and outer annular walls forming a water-chamber therebetween, the lower ends of the several jackets being contracted and provided with a discharge orifice or orifices, the contracted ends of the upper jackets of the series extending and adapted to discharge into the upper widened ends of the succeeding jackets, the inner walls of the several jackets forming a continuous upwardly-extending central heating-chamber, and the space confined between the outer walls of these jackets and the casing forming an outer heating-space, a burner in the casing adapted to discharge the products of combustion into the central upwardly-extending heating-chamber and into the outer heating-space, and a water-pipe extending into the casing and upwardly in the central upwardly-extending heating-chamber, and adapted for discharging into the water-chamber of the upper jacket.

5. In a heater, the combination, of a casing, a water-jacket within the casing, said jacket provided with a discharge pipe or pipes, a channel or trough supporting the jacket, a burner located immediately beneath the channel or trough, a fuel-supply pipe leading to the burner and adapted to be connected to a source of supply, and a water-pipe in the casing having one end adapted for connection to a source of supply, and its other end adapted to discharge into the water-jacket.

In testimony whereof I affix my signature in presence of two witnesses.

JOHN P. WENSING.

Witnesses:
A. L. MORSELL,
ANNA V. FAUST.